United States Patent [19]

Masaki

[11] Patent Number: 4,639,791
[45] Date of Patent: Jan. 27, 1987

[54] IMAGE OVERLAY APPARATUS WITH ELECTRONIC IMAGE STORAGE

[75] Inventor: Hisaji Masaki, Yokohama, Japan

[73] Assignee: Canon Kabushiki Kaisha, Tokyo, Japan

[21] Appl. No.: 669,528

[22] Filed: Nov. 8, 1984

[30] Foreign Application Priority Data

Nov. 15, 1983 [JP] Japan ................... 58-215721

[51] Int. Cl.⁴ .................. H04N 1/23; H04N 1/29; G03B 27/52; G03B 27/10
[52] U.S. Cl. ..................... 358/300; 364/520; 364/523; 355/41; 355/84
[58] Field of Search .............. 358/300; 346/153.1, 346/160, 165, 107, 108; 364/519, 520, 523; 355/7, 41, 84, 14 C

[56] References Cited

U.S. PATENT DOCUMENTS

| 4,122,462 | 10/1978 | Hirayama et al. | 358/300 X |
| 4,167,324 | 9/1979 | Wu | 355/7 X |
| 4,320,962 | 3/1982 | Takahashi et al. | 358/300 X |
| 4,417,805 | 11/1983 | Kishi | 358/300 X |
| 4,506,342 | 3/1985 | Yamamoto | 355/14 C X |
| 4,549,077 | 10/1985 | Kataoka | 355/14 C X |

Primary Examiner—E. A. Goldberg
Assistant Examiner—Patrick W. Foster
Attorney, Agent, or Firm—Fitzpatrick, Cella, Harper & Scinto

[57] ABSTRACT

There is disclosed a recording apparatus capable of easily overlaying two images. One image is read photoelectrically and supplied as electrical signals, while the other image is stored in a read-only memory and supplied as electrical signals. The read-only memory is also used for storing control information for the overlaying process.

12 Claims, 9 Drawing Figures

IMAGE OVERLAY APPARATUS WITH ELECTRONIC IMAGE STORAGE

BACKGROUND OF THE INVENTION

1. Field of the Invention

The present invention relates to a copying apparatus, more particularly to a recording apparatus for electrically reading an original image and reproducing said image through electrical image signals.

2. Description of the Prior Art

There are already known recording apparatus capable of overlaying images, in which a predetermined format prepared on an ordinary paper sheet is optically copied and electrically generated image information is simultaneously is synthesized, for example through a laser beam, on a photosensitive drum to obtain a synthesized image output. In such apparatus the predetermined format is stored on an ordinary paper sheet and is therefore inconvenient for storage and handling.

There is also known a process of generating the image data and the format both as electrical signals, electrically synthesizing these two signals and supplying the synthesized signals for example to a laser beam printer for image output. This process, though being more advanced in the control of formats than the process described above, is generally suited for image recording of a large amount and requires a large computer system for the preparation of the image data and the format data. Stated differently, such process is suitable for processing a large amount of information prepared through the use of an expensive memory device such as a magnetic tape device or a disk device. Such image overlay is already employed for example in the on-line high-speed recording apparatus, but is too cumbersome for use in the ordinary office works.

SUMMARY OF THE INVENTION

An object of the present invention is to eliminate the above-described drawbacks.

Another object of the present invention is to provide an improvement in the recording apparatus.

Still another object of the present invention is to provide a recording apparatus capable of efficiently synthesizing an original image with a stored image through the use of a simple structure.

Still another object of the present invention is to provide a recording apparatus capable of storing control information relating to recording operation and image signals in a single memory, thus facilitating the recording operation.

Still another object of the present invention is to provide a recording apparatus capable of avoiding errors in recording the stored image.

The foregoing and still other objects of the present invention will become apparent from the following description which is to be taken in conjunction with the attached drawings, and also from the appended claims.

DETAILED DESCRIPTION OF THE PREFERRED EMBODIMENTS

Now the present invention will be explained in detail by an embodiment shown in the attached drawings.

Figure 1:
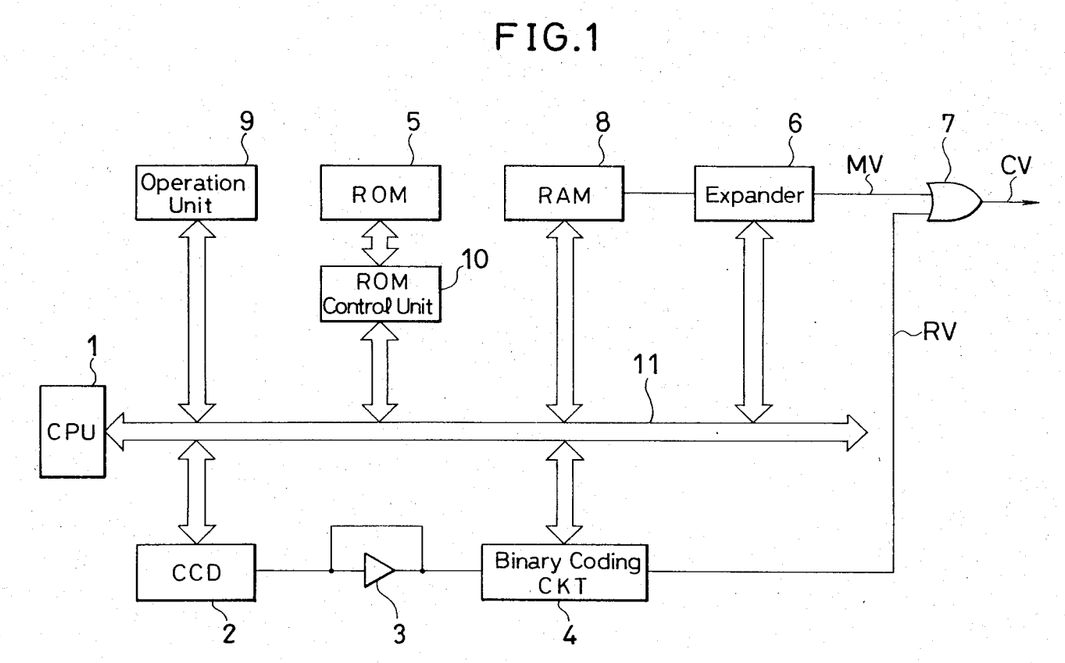
FIG. 1 is a block diagram showing an example of the circuit structure of a recording apparatus embodying the present invention.

FIG. 1 shows a synthesizing process unit A embodying the present invention, and adapted to synthesizing binary image signals obtained by reading an original with a charge-coupled device (CCD) with binary image signals stored in advance in a read-only image memory (ROM).

In FIG. 1 there are shown a solid-state image sensor (CCD) 2 for photoelectrically reading an original bearing information to be copied; an amplifier 3 for amplifying the analog output signals from the CCD 2; a processing circuit 4 for comparing the analog signals representing the original density from the CCD 2 with a certain threshold value to form binary image signals RV; a read-only memory (ROM) 5 for storing, in compressed form, image information of a format or the like to be synthesized with the original image read by the CCD 2; a ROM control unit 10 for controlling the read-out of the information from the ROM 5; a random access memory (RAM) 8 for temporarily storing the information read from the ROM 5; an expansion processing unit 6 for expanding the compressed image information read from the ROM 5; an OR circuit 7 for receiving the binary image signals RV corresponding to the original and image signals MV read from the ROM 5 and expanded in the expansion process unit 6 and supplying synthesized image signals CV to a succeeding unit such as a printer; and a controller unit(CPU) 1 composed of a known microcomputer for sequential process control through a bus 11.

Figure 2:
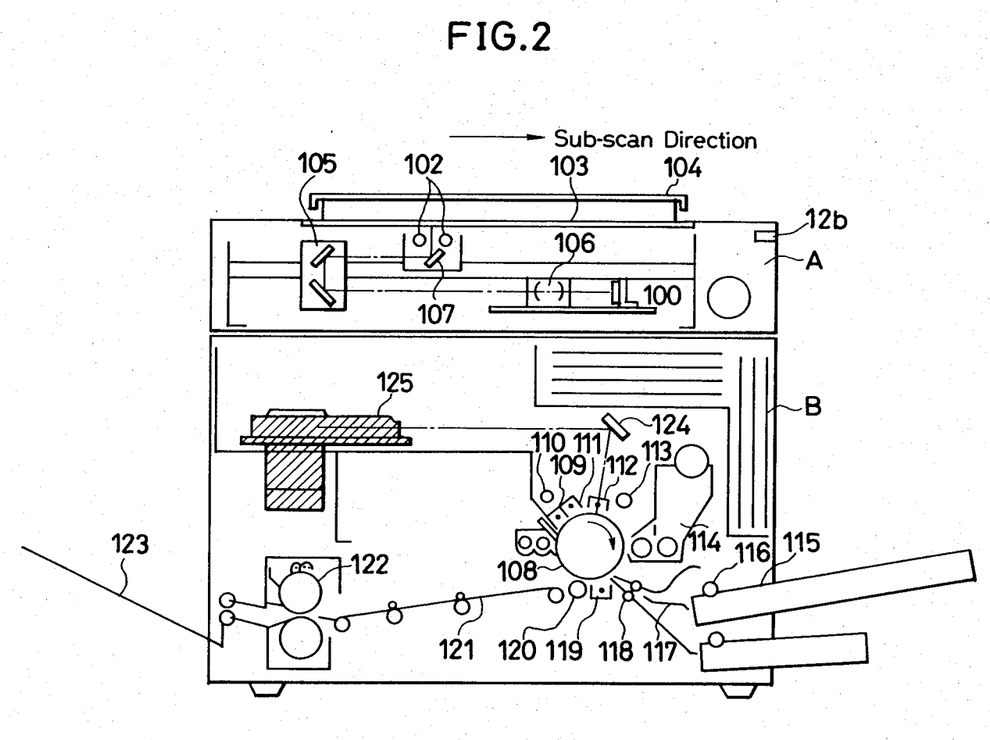
FIG. 2 is a cross-sectional view showing the internal structure of the recording apparatus.

FIG. 2 shows, in a cross-sectional view, a reader A for original reading and a printer B for image recording. The original document is placed, with the image bearing face downwards, on an original supporting glass 103, and is pressed against glass 103 by an original cover 104. The original is illuminated by a fluorescent lamp 102, and the reflected light is guided through mirrors 107, 105 and a lens 106 and focused on the CCD 100, wherein said mirrors 107 and 105 are moved at a speed ratio of 2:1. In the course of original reading, the above-described optical unit moves from left to right at a constant speed, under PLL control by means of an unrepresented DC servo motor, and, after the completion of the original reading, the optical unit moves back from right to left with a higher speed than in the forward movement referred to above. A format-storing ROM to be explained below is mounted at a position 12b.

Serial image signals obtained by processing in the reader A are supplied to a laser scanning optical system unit 125 in the printer B. Said unit is composed of a semiconductor laser, a collimating lens, a rotary polygonal mirror, an F-θ lens, and an image inclination compensating optical system. The image signals from the reader are supplied to the semiconductor laser for electrooptical conversion, and the emitted laser beam is converted into a parallel beam by the collimating lens and enters the rotary polygonal mirror rotating at a high speed for scanning a photosensitive member 108 through a mirror 124.

Said photosensitive member 108 is for example composed of three layers, i.e, a conductive layer, a photosensitive layer and an insulating layer. Along said photosensitive member there are positioned process components for enabling image formation on said member, said components comprising a preliminary charge eliminator 109; a preliminary charge eliminating lamp 110; a primary charger 111; a secondary charger 112; a flush exposure lamp 113; a developing unit 114; a sheet cassette 115; a sheet feeding roller 116; a sheet feeding guide 117; a registration roller 118; a transfer charger 119; a separating roller 120; a sheet transport guide 121; a fixing unit 122; and a tray 123.

Figure 3:
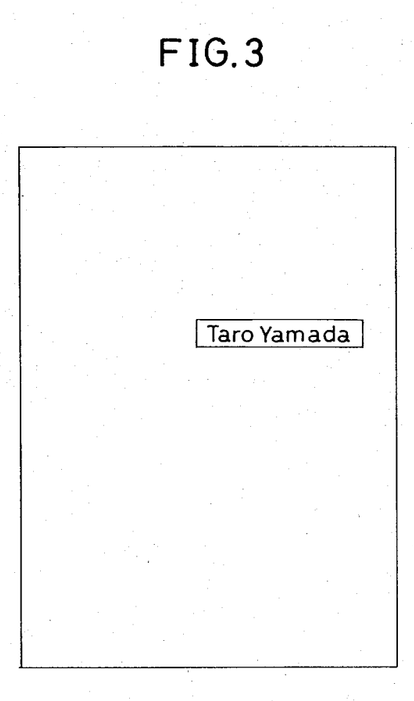
FIG. 3 is a schematic plan view showing an original.
Figure 4:
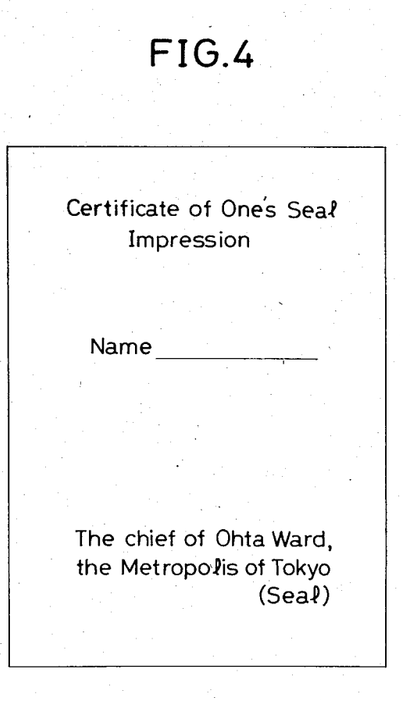
FIG. 4 is a schematic plan view showing a stored image.
Figure 5:
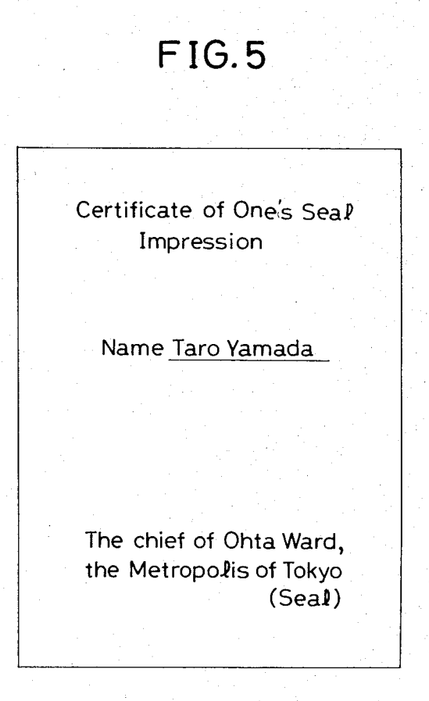
FIG. 5 is a schematic plan view showing a synthesized image.

FIG. 3 shows an example of the original to be copied while FIG. 4 shows an example of a predetermined format image stored in the ROM 5, and FIG. 5 shows an example of the output image obtained by synthesizing the images shown in FIGS. 3 and 4. This example shows a case of synthesizing a format for official stamp certificate with the name of applicant for said certificate.

Figure 7:
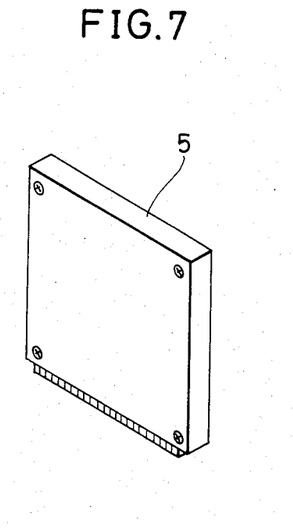
FIG. 7 is an external view of the read-only memory.

FIG. 7 shows the external view of the ROM 5 of the present embodiment, employing a magnetic bubble memory. As an example, reading an image of A4 size ($210 \times 297$ mm) with a resolving power of 64 pixels/mm$^2$ provides binary signals of about 4 million bits. However the amount of information can be reduced to ca. 20% by a suitable compression process, for example redundancy suppressing encoding utilized in the facsimile communication such as the modified Huffman encoding. Consequently the business forms employed in the daily business works can mostly be compressed to the order of $4 \times 0.2 = 0.8$ million bits, and a relatively small ROM of a reasonable capacity can store several to more than ten formats in the compressed form.

Figure 6:
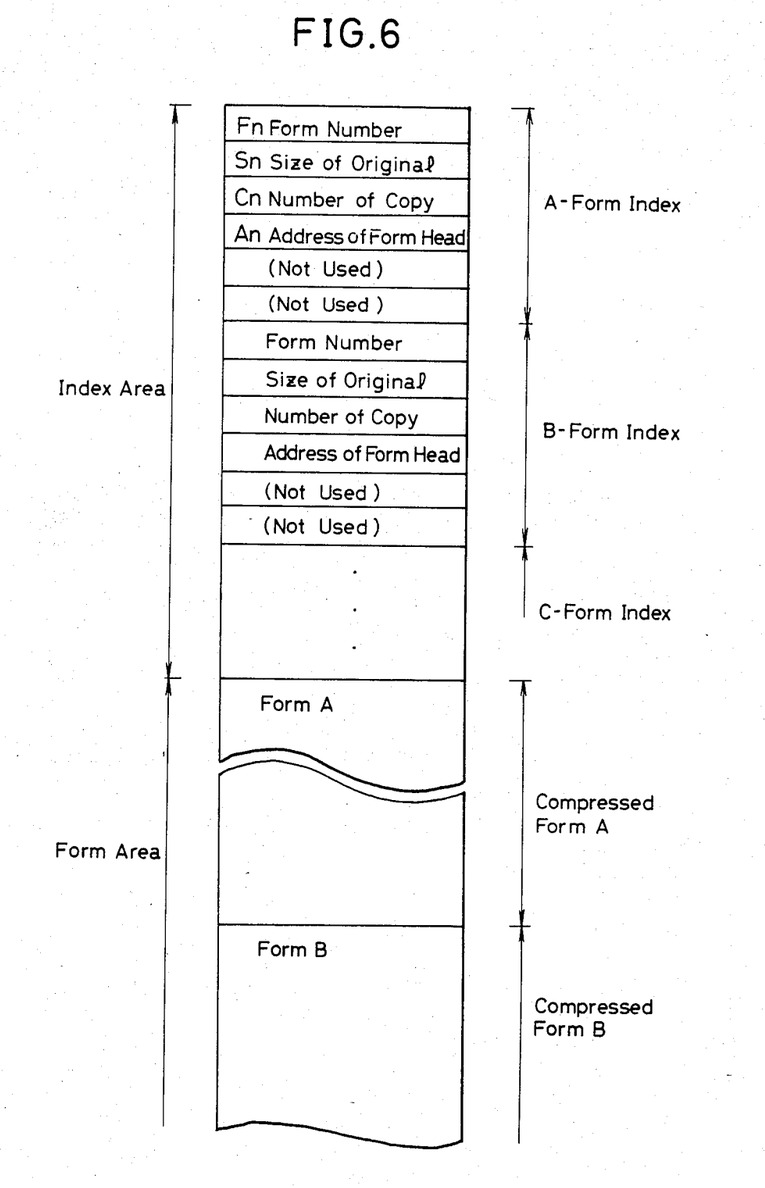
FIG. 6 is a chart showing the structure of a read-only memory.

FIG. 6 shows the memory area of the ROM, which is divided into an index area and a form area. Each form number Fn in the index area corresponds to a format an original size Sn indicates the size of recording obtained when the form Fn is recorded on the recording sheet at a predetermined recording speed. A copy number Cn indicates the number of copies predetermined for the form, for example two copies or duplicate. A form head address An indicates a starting address of the ROM from which the compressed format corresponding to said index is stored. The index data corresponding to each format are stored in the index area simultaneously with the storage of said format into the form area.

Figures 8, 8A:
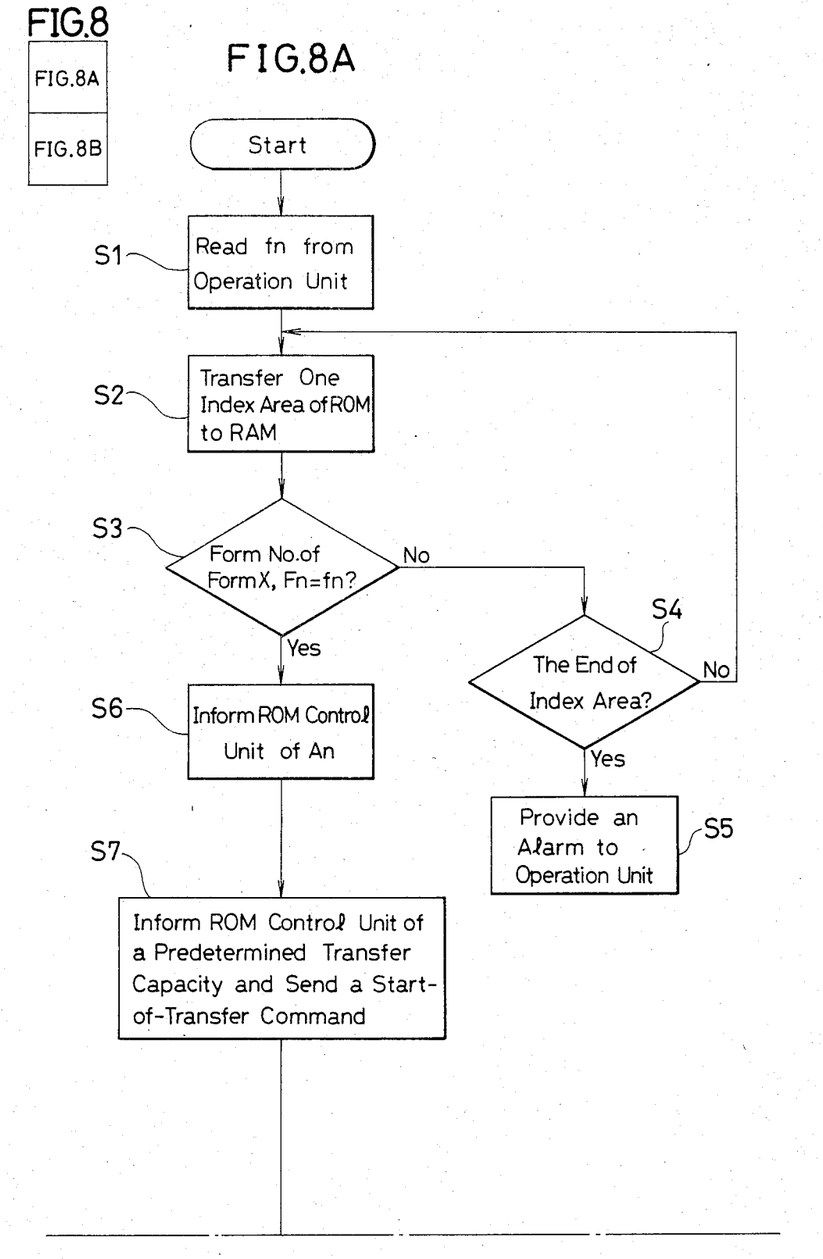
FIG. 8 composed of FIGS. 8A and 8B is a flow chart showing a control procedure.
Figure 8B:
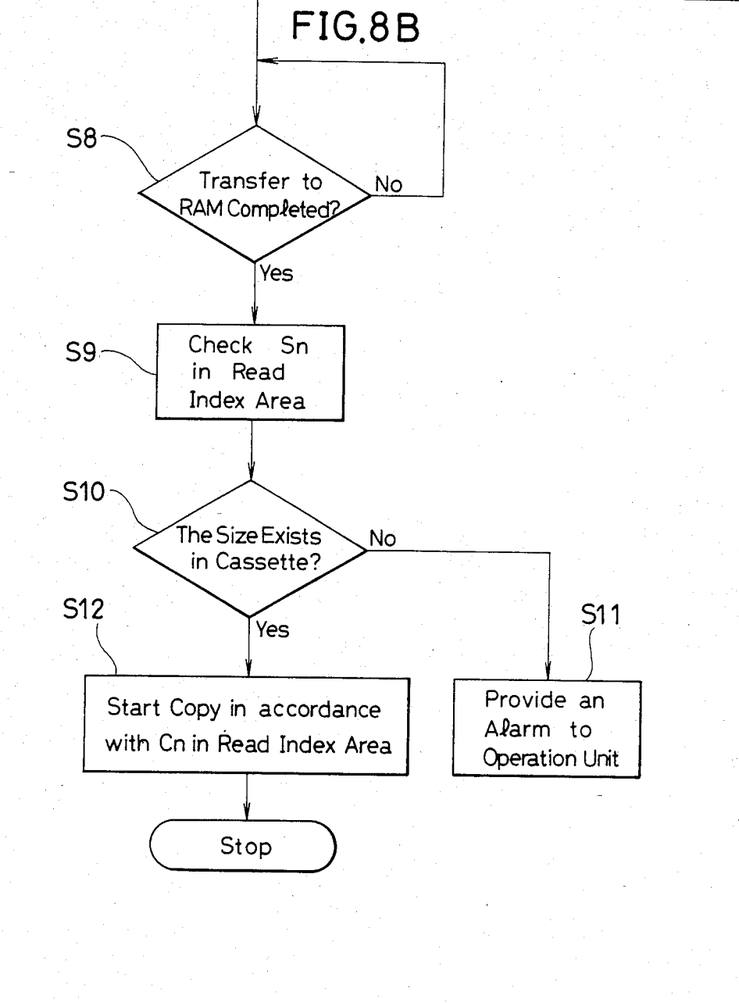

The function of the embodiment described above will be explained in the following with reference to a flow chart shown in FIG. 8. The program corresponding to said flow chart is stored in advance in a ROM incorporated in the control unit 1. At first an original bearing information to be copied, for example the original shown in FIG. 3, is placed on the original supporting glass 103. Then the form number Fn etc. of an image to be synthesized with the original image is entered from an unrepresented operation unit.

The entered form number Fn is read and recognized, in a step S2, by the controller 1, and a corresponding format is searched in the ROM 5 in steps S2 and S3. Said search is conducted by one-by-one search of the index information in the index area shown in FIG. 6. Upon retrieval of the desired format, the program proceeds to a step S6 to transmit the head address of said compressed format to the ROM control unit 10. In case the desired format Fn is not found in the index area, the program proceeds from the step S4 to a step S5 to activate an unrepresented alarm unit for generating a visual or acoustic alarm.

In case all the formats cannot be stored in a single ROM, the unused part in the index area shown in FIG. 6 may be utilized to store the number of the additional ROM's storing other formats, whereby the number of the ROM to be mounted next may be displayed on an unrepresented display unit.

Then, a step S7 transmits the amount of information of the form from the retrieved index area to the ROM control unit 10, and instructs the transfer of format information from the ROM 5 to the RAM 8, whereby the format information designated by the operation unit 9 is transferred from the ROM 5 to the RAM 8. Then a step S8 discriminates the completion of said transfer from a signal indicating said completion, and, upon said completion, the program proceeds to a step S9 to identify the original size Sn from the index area. A succeeding step S10 discriminates whether a sheet of the original size Sn is set in the cassette 115 of the printer B, thus automatically selecting a sheet size matching the original size Sn. If such sheet is not set, a step S11 displays a message of that effect on an unrepresented display unit. On the other hand, if the sheet set in the cassette matches the original in size, the program proceeds to a step S12 to effect the original reading and the expansion of the compressed information by a number of times according to the copy number Cn stored in the index area, thus obtaining copies of the synthesized image.

Otherwise it is also possible to store, in a frame memory, the image synthesized from the information obtained by original reading and from the compressed information, and to repeat the printing operation alone by a number of times according to the copy number Cn. The flow of signals in the copying operation will now be explained. The copying operation of an original is started by the cooperative function of the CCD 100 and the mirrors 105, 107, and the image signals are supplied from the CCD 100 to the binary encoding unit 4. On the other hand, the expansion processing unit 6, for generating the format to be synthesized, initiates the expansion of the information from the RAM 8 simultaneously with the start of the scanning of said original. The original signals RV and format signals MV are synthesized into image signals CV in the OR circuit 7, and said signals CV are supplied to the laser beam printer B.

In the foregoing embodiment the compressed image informaiton is stored in a bubble memory as shown in FIG. 7, but such memory may be replaced by other temporary memory for the image information read from a floppy disk or a magnetic disk. Also various control information for image formation may be stored in the index information in the ROM. Furthermore, the ROM 5 may be attached to the printer B.

It is furthermore possible to store the formats in a small magnetic card such as the one used for cash card, and such card is very light and small, and is convenient for handling.

Furthermore, the operation unit may be so constructed as to send information to the ROM control unit 10 for making additional copies, in case some or all of several copies obtained according to the copy number information Cn are lost for some reason.

The laser beam printer employed in the embodiment described above may be replaced by other printers such as an ink jet printer or a thermal printer, and the original reading may also be achieved by reading the original with a fixed image sensor while the original is moved. The compression of the image information may be achieved through known modified Huffman process or modified Read process.

The storage of the control information for the copier and the format signals in a single memory allows to avoid cumbersome copying operation, and to obtain the copies of desired number in a correct format. Besides the ROM storing the compressed data is rendered detachable, thus enabling format overlaying function with easy handling and control.

The present invention is by no means limited to the embodiment described above but is subject to various modifications within the scope and spirit of the appended claims.

What is claimed is:

1. A recording apparatus comprising:
   memory means for holding previously stored constant information and control information relating to a recording mode of the constant information;
   recording means for synthesizing variable information and the constant information from said memory means and recording the synthesized information; and
   control means for controlling said recording means to achieve synthesized recording in response to said control information.

2. A recording apparatus according to claim 1, wherein said memory means is detachable from said recording apparatus.

3. A recording apparatus according to claim 1, wherein said memory means stores one or plural information in a compressed form.

4. A recording apparatus according to claim 1, wherein the control information has one-to-one correspondence to the constant information stored in said memory means.

5. A recording apparatus comprising:
   memory means for storing constant information and information relating to the output size of the constant information;
   detecting means for detecting the size of a recording material set in the recording apparatus;
   comparison means for comparing the output size information read from said memory means to the size detected by said detecting means; and
   display means for displaying an alarm, when the output size information in said memory means does not coincide with the size detected by said detecting means in the synthesized recording of variable information and the constant information obtained from said memory means.

6. A recording apparatus according to claim 5, wherein said recording material is automatically selected according to the size information from said memory means.

7. A recording apparatus according to claim 1, further comprising second memory means for storing the constant information read from said memory means, wherein said control means is disabled until the constant information has been completely transferred to said second memory means.

8. A recording apparatus according to claim 1, wherein the control information includes index information for searching the constant information stored in said memory means.

9. A recording apparatus according to claim 1, wherein the control information includes information as to a set number of records and said control means controls the recording in response to the set number information.

10. A recording apparatus according to claim 1, wherein said memory means is a read only memory.

11. A recording apparatus according to claim 1, further comprising means for photoelectrically reading an original image, wherein the variable information consists of image information read by said reading means.

12. A recording apparatus according to claim 5, further comprising means for photoelectrically reading an original image, wherein the variable information consists of image information read by said reading means.

* * * * *